Feb. 28, 1928.                                          1,660,792
C. A. HIRTH
SHAFT COUPLING
Filed Sept. 27, 1926          2 Sheets-Sheet 2
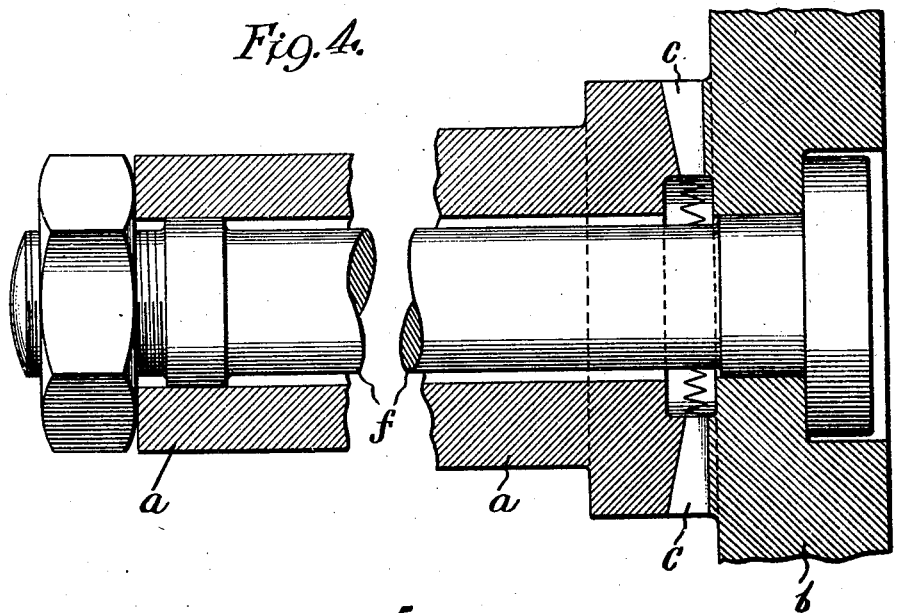
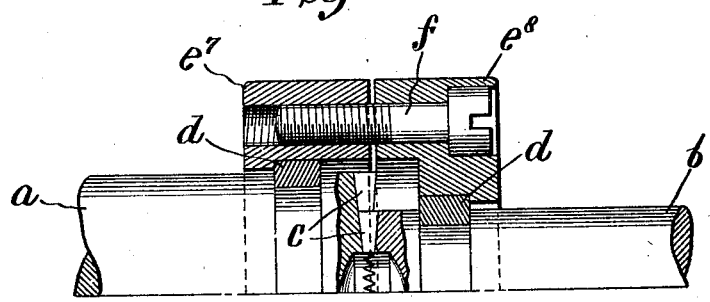
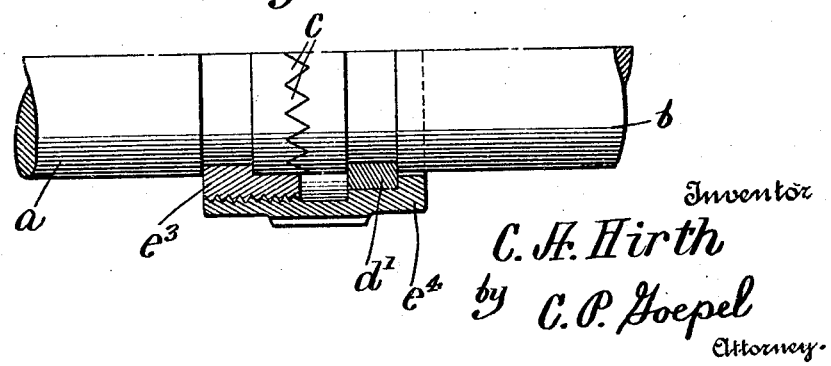
Inventor
C. A. Hirth
by C. P. Goepel
Attorney.

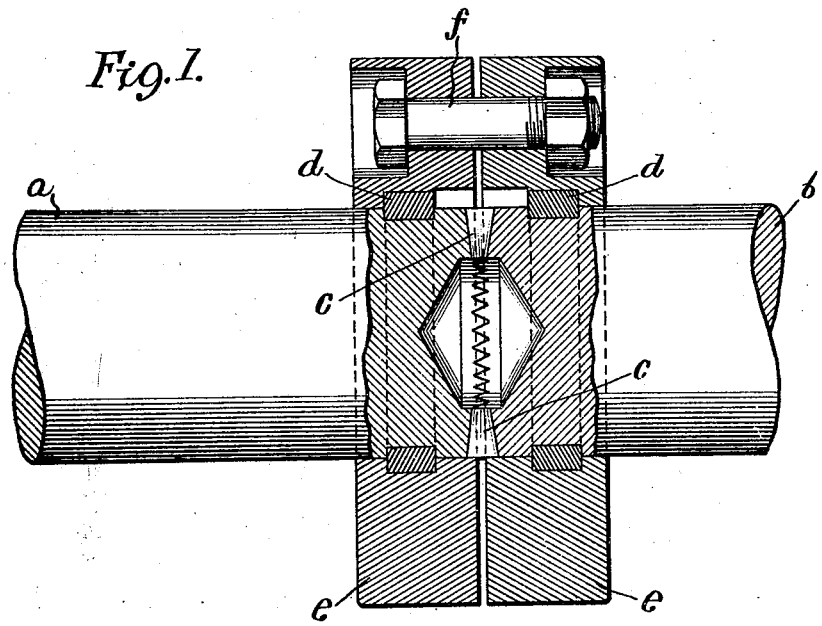
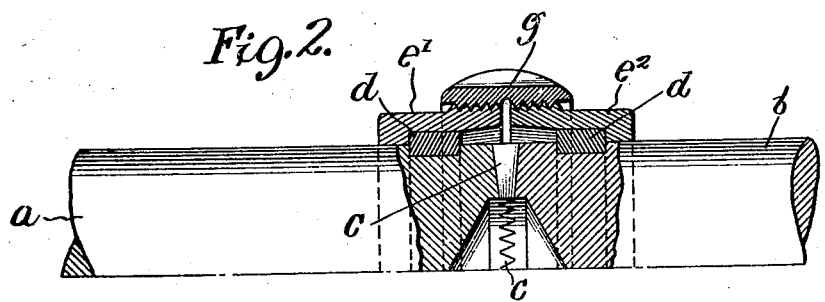
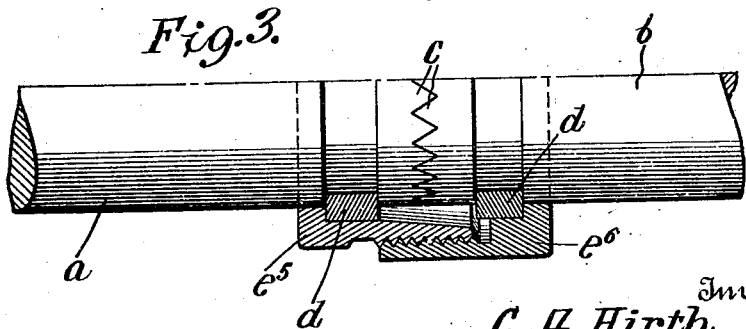

Patented Feb. 28, 1928.

1,660,792

UNITED STATES PATENT OFFICE.

CARL ALBERT HIRTH, OF NONNENHORN-ON-THE-BODENSEE, GERMANY.

SHAFT COUPLING.

Application filed September 27, 1926, Serial No. 138,052, and in Germany December 23, 1924.

My invention relates to shaft couplings, more especially of the kind comprising symmetrical serrations with teeth the faces of which are inclined to the axis of the shafts and the crest and root lines of which are arranged radially to the axis of the shafts.

It is an object of my invention to provide a coupling of the kind described devoid of all intermediate parts, the ends of the shafts engaging directly so that they are coupled more accurately and with higher efficiency.

In the drawings affixed to this specification and forming part thereof several couplings embodying my invention are illustrated diagrammatically by way of example.

In the drawings

Figs. 1, 2, 3, and 5 are partly sectional elevations illustrating shafts of equal diameter, coupled together, while Fig. 4 is a similar view showing coupled shafts of different diameters.

Figure 6 is a partial sectional view through the shaft coupling showing a slight modification in the coupling means.

In all figures, $a$ and $b$ are the shafts and $c$ are the serrations.

Referring first to Figs. 1, 2, 3, and 5, identical serrations $c$ are machined or otherwise made in the ends of the shafts to be coupled. The faces of each tooth converge toward the axis of the shaft and the crests and the roots of the serrations are arranged on conical faces which intersect in the axis of the shafts. With good workmanship the contact of such a coupling is excellent and at the same time the shafts are centered due to the wedge-like shape of the teeth.

Except in the modification illustrated in Fig. 4 the ends of the shafts are provided with split rings $d$ inserted in grooves near the ends of the shaft.

In the modification illustrated in Fig. 1, flanges $e$ are placed over the rings and axial thrust is exerted on these flanges by screws $f$. Any number of such screws may be provided.

Screws require a comparatively large diameter of the flanges, and in order to overcome this drawback, the screws can be replaced by a threaded sleeve $g$ as shown in Fig. 2 which engages opposite threads at the inner ends of two rings $e'$, $e^2$ which are placed over the rings $d$.

A similar construction is shown in Fig. 6 but here only one ring $d'$ is provided in a groove of the shaft $b$, the other ring being replaced by a threaded ring $e^3$ engaging a groove in the shaft $a$ on which ring $e^3$ is secured a sleeve $e^4$ which engages behind the ring $d'$. This construction dispenses with a separate sleeve $g$ and with the necessity of providing opposite threads on the sleeves $e'$ and $e^2$, as in Fig. 2.

A form in which opposite threads are also eliminated is shown in Fig. 3. It substantially resembles the form shown in Fig. 6 but the inner sleeve $e^5$, instead of being inserted in a groove of the shaft $a$, engages a split ring $d$ inserted in a groove at the end of the shaft $a$. The corresponding sleeve $e^6$ resembles the sleeve $e^4$ in Fig. 6.

Fig. 5 illustrates a coupling in which the shaft $b$ has a smaller diameter than the shaft $a$. The serrations $c$ are constructed as above described and flanges $e^7$ and $e^8$ are placed over the split rings $d$ in both shafts and are connected with any desired number of screws as described with reference to Fig. 1. Obviously constructions as described with reference to the other figures may also be provided.

I wish it to be understood that I do not desire to be limited to the exact details of construction shown and described for obvious modifications will occur to a person skilled in the art.

I claim:—

1. A shaft coupling comprising a pair of shaft sections having central recesses in their meeting ends and provided at their peripheral portions with annular series of teeth extending endwise from the shaft sections for interfitting engagement when the shaft sections are brought together, said teeth constructed with their inner faces converging and the roots and crests of the teeth providing elements of cones whose vertices lie in a common point on the axis of each shaft section.

2. A shaft coupling comprising a pair of shaft sections of like construction adapted to abut at their ends, each shaft section having a central opening in its end and an annular series of teeth about the opening and extending lengthwise of the shaft section, the teeth having converging faces and having their roots and crests comprising elements of cones whose vertices lie on the axis of the shaft section, and means for adjustably drawing said shaft sections together in endwise engagement with the teeth in interfitting relation for taking up wear on the cone portions of the teeth and automatically centering the shaft sections.

In testimony whereof I affix my signature.

CARL ALBERT HIRTH.